United States Patent [19]

Thayne

[11] Patent Number: 4,504,735

[45] Date of Patent: Mar. 12, 1985

[54] DUAL THROAT DATA REGISTERING APPARATUS AND CARD THEREFOR

[75] Inventor: Stephen W. Thayne, San Anselmo, Calif.

[73] Assignee: Computer Election Systems, Berkeley, Calif.

[21] Appl. No.: 495,266

[22] Filed: May 17, 1983

[51] Int. Cl.³ ............................................. G07C 13/00
[52] U.S. Cl. .................................... 235/50 A; 225/93
[58] Field of Search ................. 235/50 R, 50 A, 50 B, 235/52, 53, 57; 225/93; 283/5, 79, 98–100

[56] References Cited

U.S. PATENT DOCUMENTS

| | | | |
|---|---|---|---|
| 3,007,620 | 11/1961 | LaFramboise et al. | 225/93 |
| 3,015,424 | 1/1962 | LaFramboise | 225/93 |
| 3,201,038 | 8/1965 | Harris | 235/50 R |
| 3,240,409 | 3/1966 | Harris | 225/93 |
| 3,677,453 | 7/1972 | Parks et al. | 225/93 |

Primary Examiner—Benjamin R. Fuller
Attorney, Agent, or Firm—Flehr, Hohbach, Test, Albritton & Herbert

[57] ABSTRACT

A data registering apparatus including a base, and first, second and third templates. The first and second templates are positionable adjacent to one another. The third template is positionable above the first and second templates. The third template is provided with apertures adapted to register with corresponding apertures in the first template and with a first set of index point areas of a data record card when the card is positioned in a first superposed operative position. The third template also includes additional apertures adapted to register with corresponding apertures in the second template and with a second set of index point areas of the record card when the card is positioned in a second superposed operative position.

16 Claims, 9 Drawing Figures

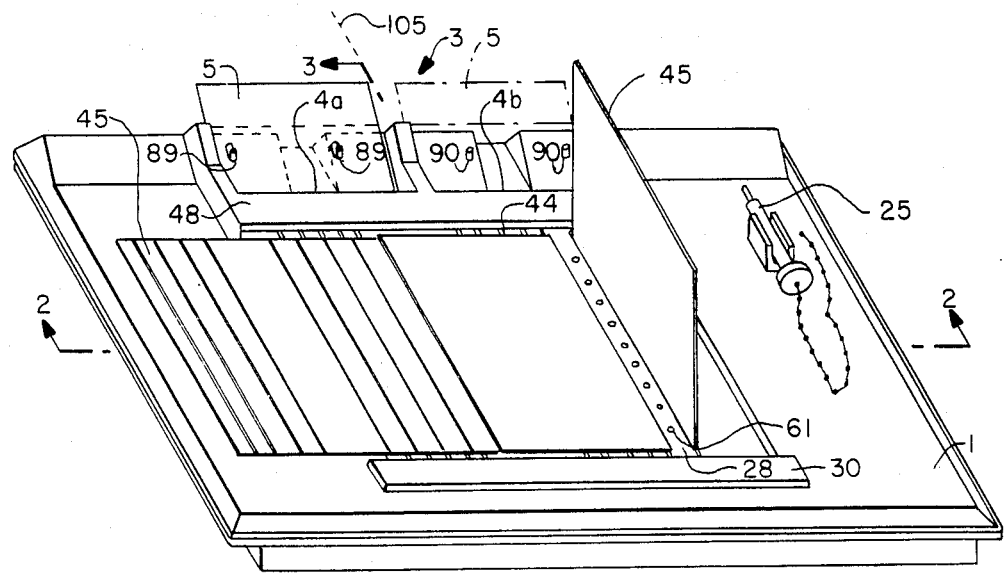
FIG.—1
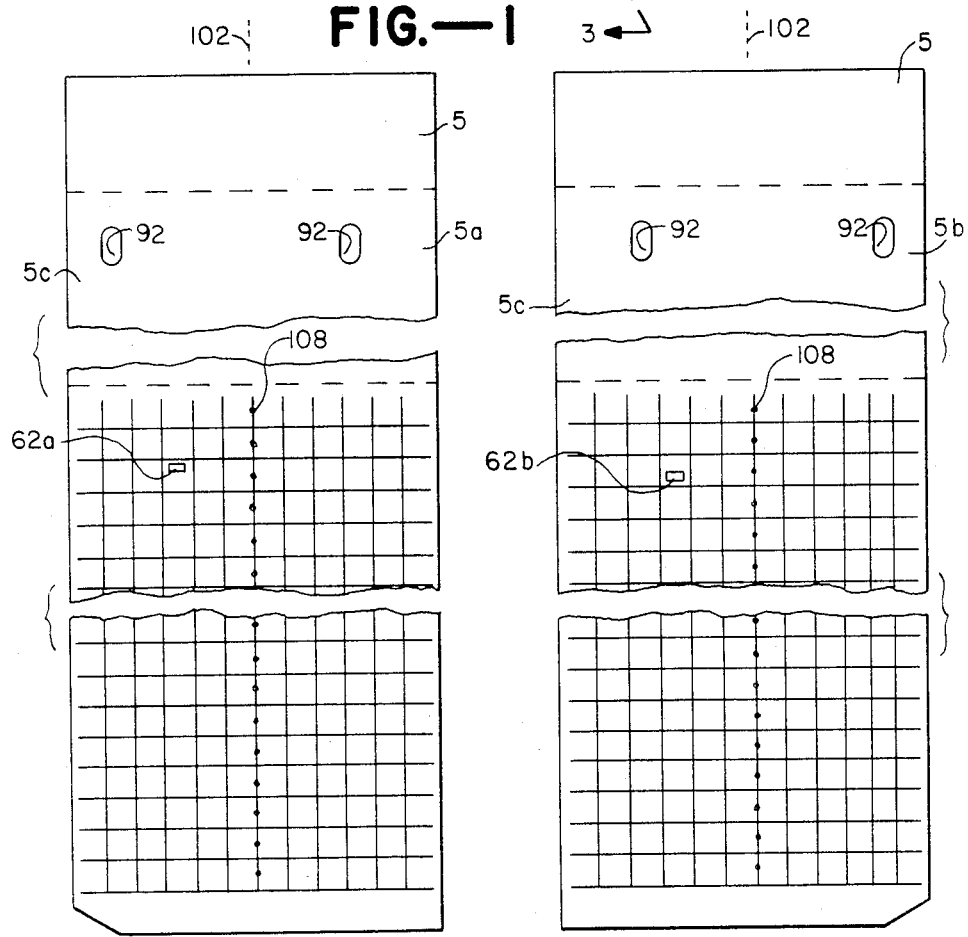
FIG.—6A  FIG.—6B

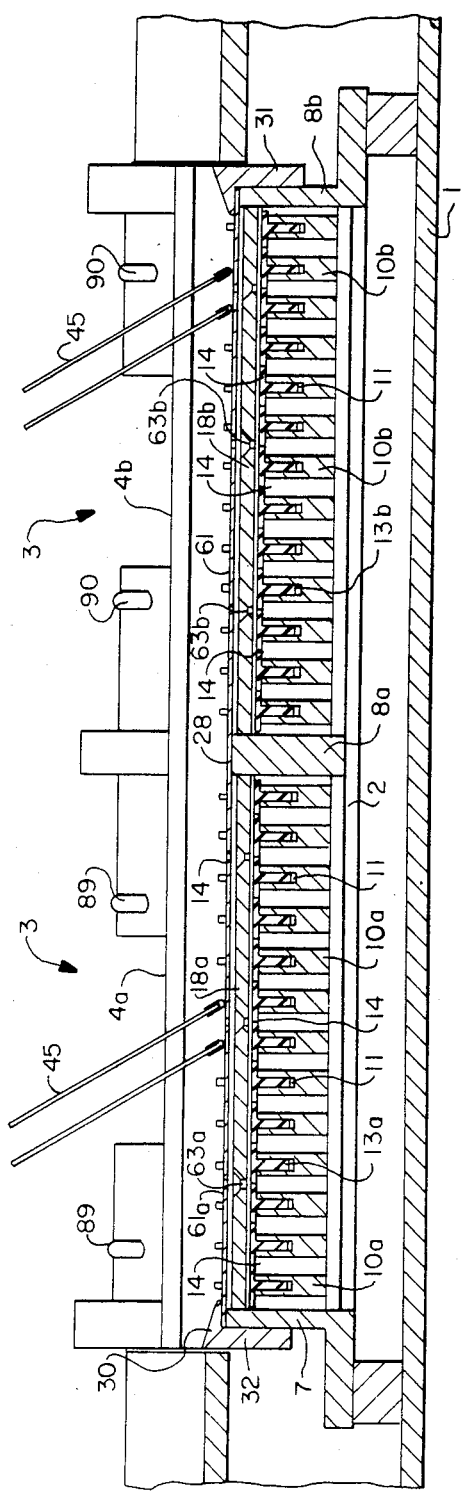
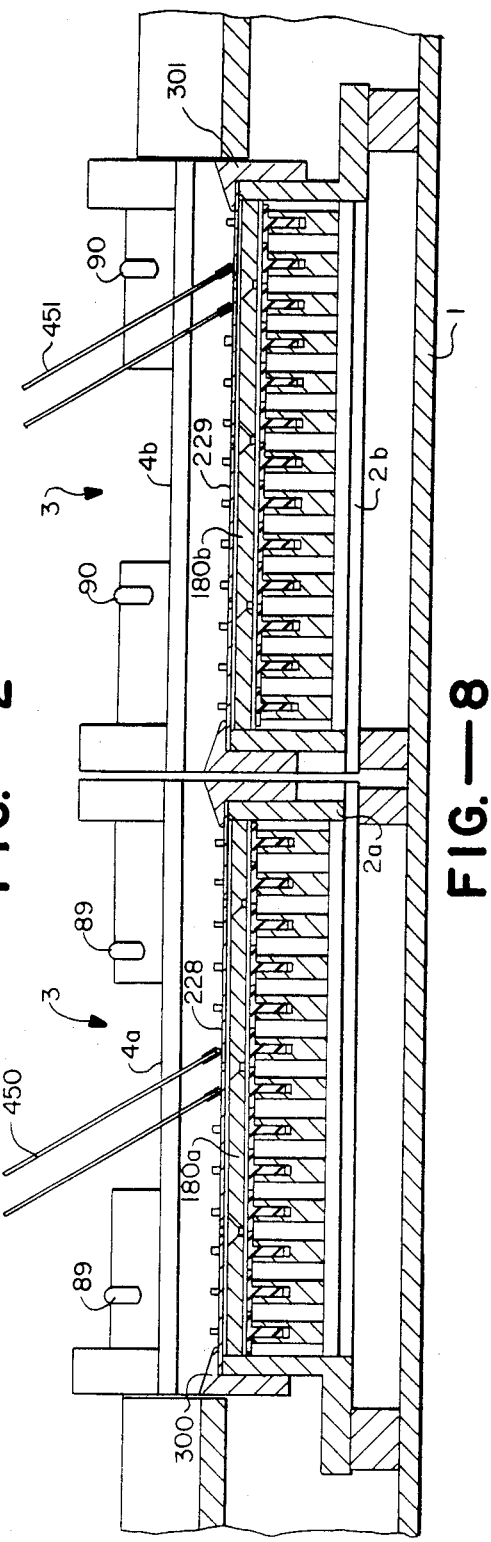

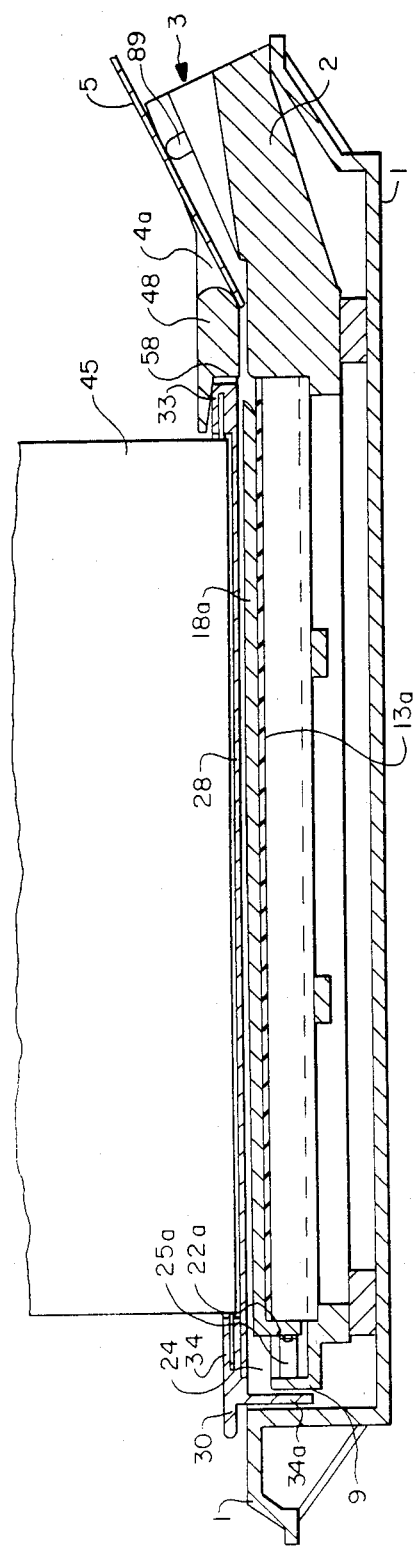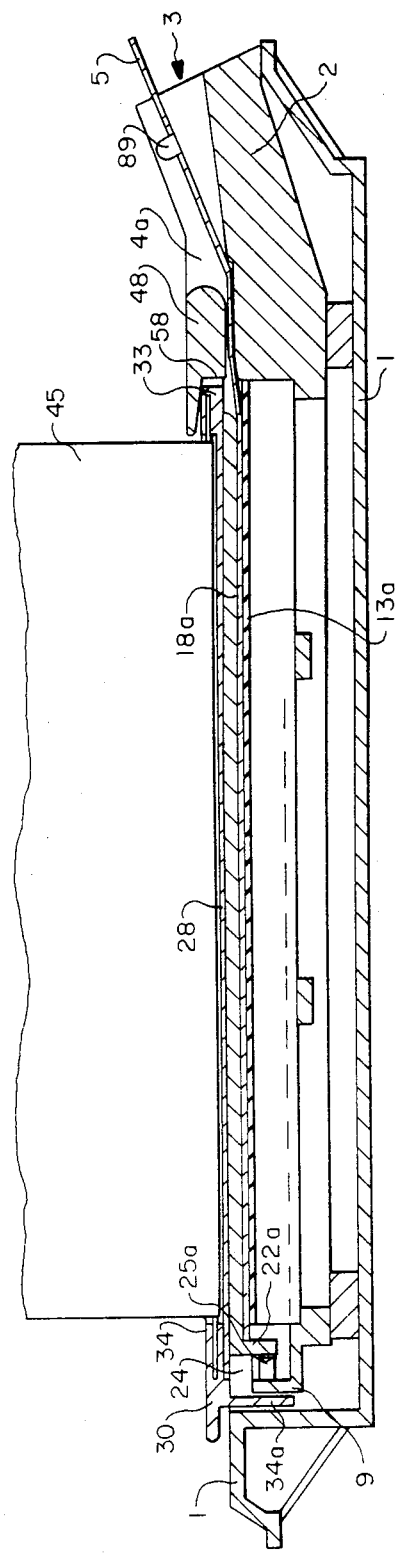

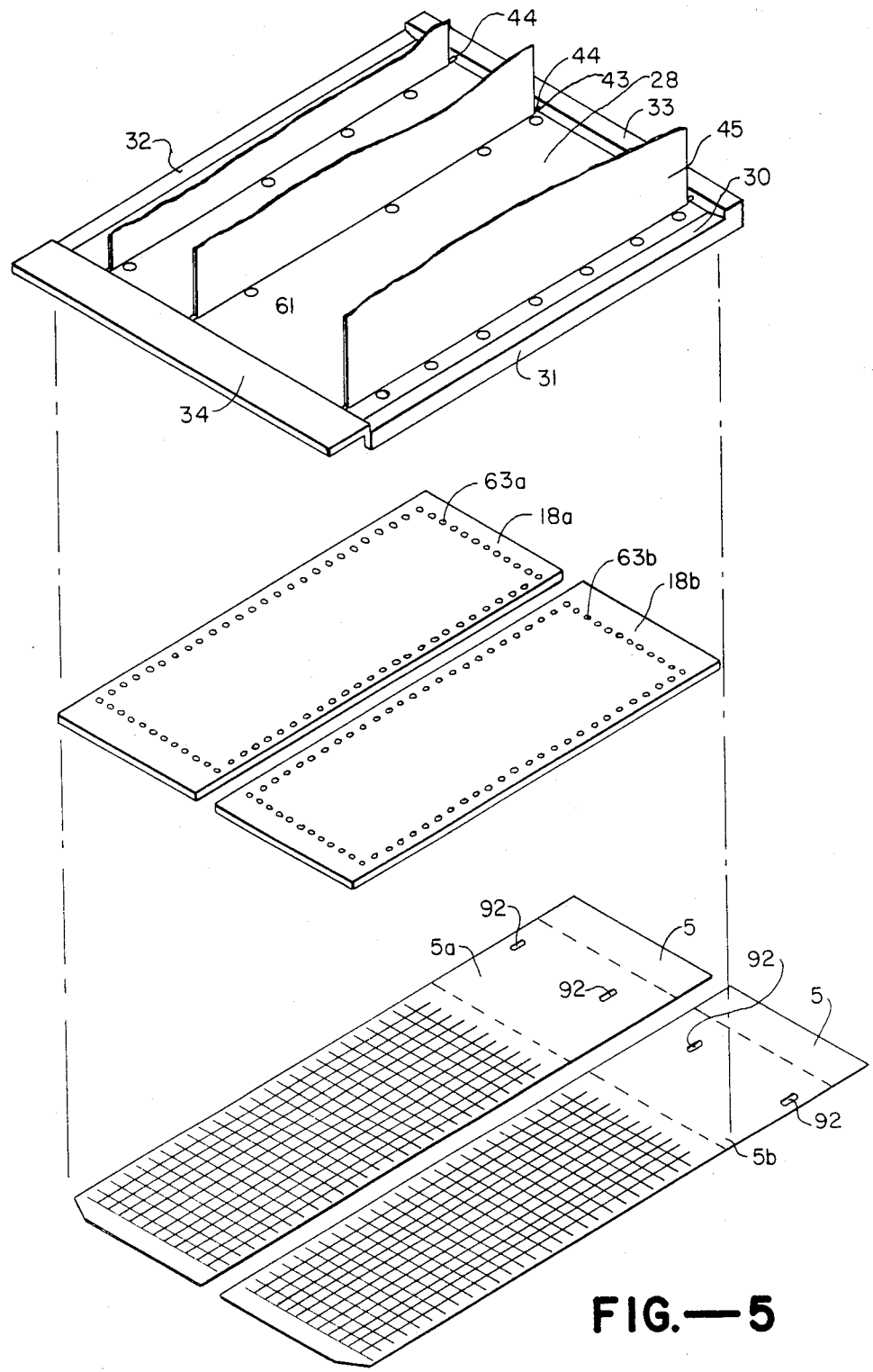
FIG.—5

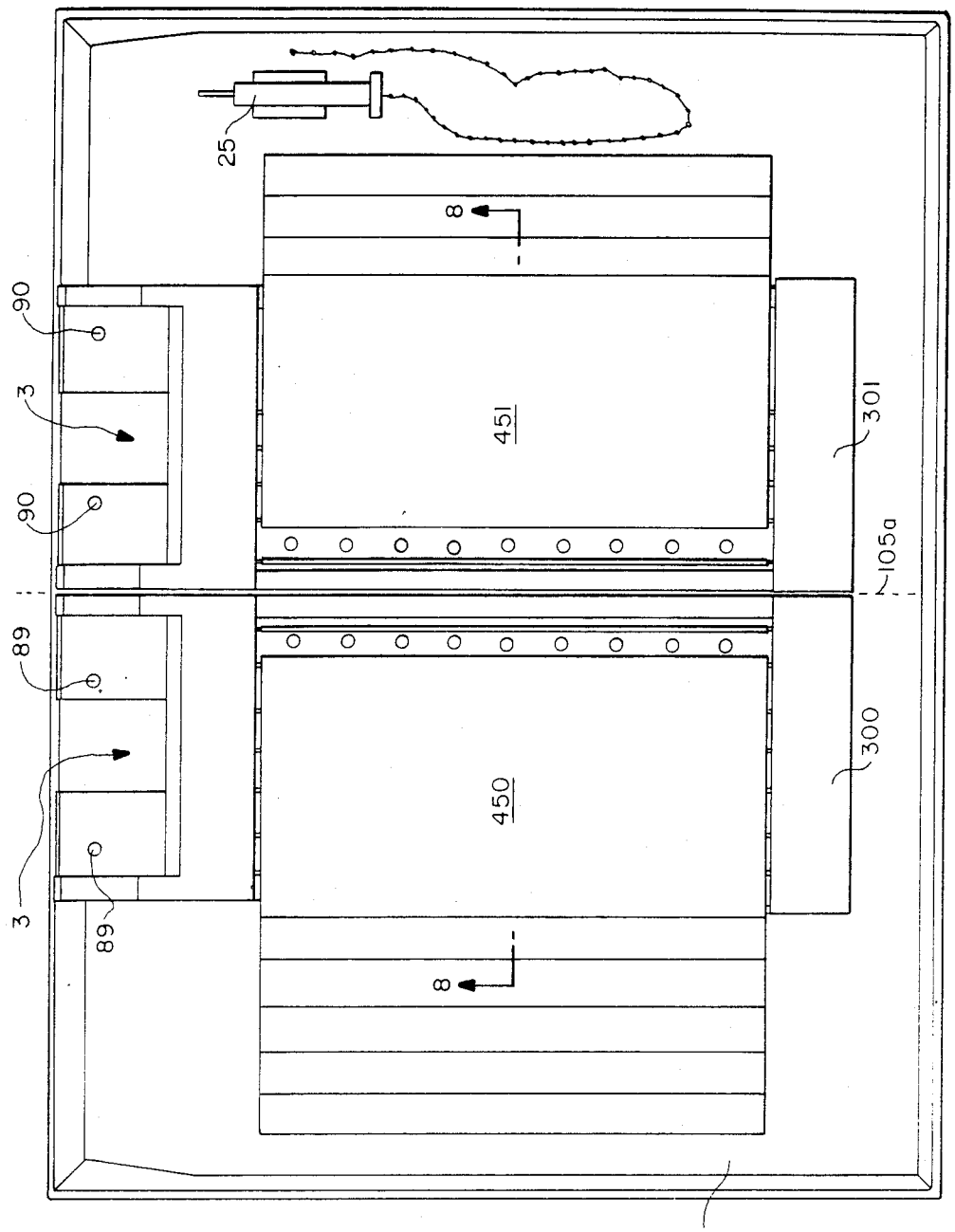
FIG.—7

DUAL THROAT DATA REGISTERING APPARATUS AND CARD THEREFOR

The present invention relates generally to apparatus for registering data on machine-processable data record cards, and more particularly to a dual throat data registering apparatus and card therefor.

The number of candidates and propositions to be voted on in any given election seem to always be increasing. Data registering apparatus of the type used heretofore, see, for example, U.S. Pat. Nos. 3,201,038 and 3,240,409, issued Aug. 17, 1965 and Mar. 15, 1966, respectively, have limited capacity in terms of the data which can be registered on a data record card used in conjunction therewith. Particularly, with these data registering apparatus, data can only be recorded on one side of a data record card. This obviously limits the amount of data which can be recorded on a single card.

Accordingly, an object of the present invention is to provide a data registering apparatus and card therefor which allows for registering more information on a data record than has heretofore been possible.

Another object of the present invention is to provide a data registering apparatus and card therefor which is inexpensive to construct, simple to use, and which provides a foolproof method for registering increased amounts of data on a single data record card.

In accordance with the present invention, the data registering apparatus includes a base, and first, second and third templates. The first and second templates are positionable adjacent to one another. The third template is positionable above the first and second templates. The third template is provided with apertures adapted to register with corresponding apertures in the first template and with a first set of index point areas of the data record card when the card is positioned in a first superposed operative position relative to the first and third templates. The third template further includes additional apertures adapted to register with corresponding apertures in the second template and with a second set of index point areas of the record card when the card is positioned in a second superposed operative position relative to the second and third templates. The data registering apparatus also includes means for mounting the templates together in a normal position so that the apertures of the third template are offset from the corresponding apertures of the first and second templates. Additionally, the apparatus includes means for shifting the first and second templates relative to the third template to bring the templates and the data record card into the first or second operative position. Positioning means are also provided for locating the record card in the first operative position and in the second operative position.

The record card includes a pair of positioning holes located at the upper end thereof with the holes being asymmetrically arranged about the longitudinal central axis of the card. The first and second sets of index point areas are formed on the front and back faces, respectively, of the card. The above-mentioned positioning means includes two respective pairs of positioning pins located on the base of the apparatus to engage the positioning holes in the card when the card is in its first or second operative position.

The apparatus of the present invention will be described in more detail hereinafter in conjunction with the drawings wherein:

FIG. 1 is a perspective view of the preferred form of the present invention;

FIG. 2 is an enlarged transverse cross-section taken along lines 2—2 of FIG. 1;

FIG. 3 is a longitudinal section taken along lines 3—3 of FIG. 1 showing the data record card about to be inserted into the data registering apparatus of the present invention;

FIG. 4 is a view similar to FIG. 3 with the data record card in a first operative position in the data registering appartus;

FIG. 5 is an exploded perspective view of certain elements of the data registering apparatus of the present invention;

FIGS. 6A and 6B are schematic views which show the front and back faces, respectively, of the data record card of the present invention;

FIG. 7 is a plan view illustrating another embodiment of the data registering apparatus of the present invention; and FIG. 8 is a view along line 8—8 of FIG. 7.

The principle on which the present invention operates is similar in many respects to that involved in U.S. Pat. No. 3,240,409, issued Mar. 15, 1966. As in that patent, the present invention will be described with reference to a typical voting operation, but the present invention lends itself to other uses such as polls, examinations and other applications where it is desired to register a relatively great amount of information in a relatively small space.

Referring now to the drawings, in which like components are designated by like reference numerals throughout the various figures, attention is first directed to the data registering apparatus of the present invention shown in FIGS. 1-5. This data registering apparatus includes a housing 1 and a base 2 centrally positioned in the housing (See FIGS. 2-4). The base includes a throat portion generally indicated at 3 which is provided with a pair of longitudinally directed slots 4a and 4b through which the data record card 5 (See FIGS. 1, 3 and 4) may be inserted into the data registering apparatus, as will be described in more detail below.

Base 2 includes longitudinally extending members 7, 8a and 8b (See FIG. 2), and an inner end 9 (See FIGS. 3 and 4) extending perpendicular to members 7, 8a and 8b. Between inner end 9 and throat 3, the base is provided with ribs 10a and 10b which extend longitudinally to the base. Ribs 10a are bounded by longitudinal members 7 and 8a, and ribs 10b by longitudinal members 8a and 8b. Both ribs 10a and 10b are provided with an upwardly opening slot 11 adapted to receive the vertically extending legs of parallel T-shaped die strips 13a and 13b, respectively. The horizontal extending portions of T-shaped strips 13a and 13b are spaced slightly apart to define longitudinally extending slits 14 which are adapted to receive therethrough the chips of the data record card during the card punching operation.

As can be seen from FIGS. 2 and 4, and as will be described below, when data record card 5 is placed in its first operative position, the card rests on the horizontally disposed portions of die strips 13a. Spaced outwardly from die strips 13a is a first inner template 18a. Template 18a is slidably disposed on die strips 13a. Similarly, when data record card 5 is in its second operative position, the card rests on the horizontally disposed portions of die strips 13b. Spaced outwardly from and slidably disposed on die strips 13b is a second inner template 18b.

Templates 18a and 18b are each provided with a transverse depending flange which is adapted to lie alongside an internal wall of the base defined by the perpendicular faces of ribs 10a and 10b. The transverse flange of template 18b is not shown, but is configured in a manner like that of flange 22a (See FIGS. 3 and 4) of template 18a, which will now be described. The perpendicular faces of ribs 10a are spaced from inner end 9 of the base to provide a recess 24 adapted to receive therein flange 22a. Flange 22a is urged against ribs 10a by leaf spring 25a which extends between flange 22a and inner end 9 of the base.

As can be seen best in FIG. 4, when record card 5 is inserted in slot 4a the above-described structure permits the inner or bottom end of the card to engage flange 22a and urge it toward inner end 9 of the base against the resiliency of leaf spring 25a. Likewise, when card 5 is inserted in slot 4b, the inner end of card 5 engages the transverse-depending flange of template 18b to urge it toward inner end 9 against the resiliency of a leaf spring (not shown) extending between the flange of template 18b and inner end 9.

Positioned above inner templates 18a and 18b is an outer template 28. The outer template, as is known in this art, is secured to a frame 30, which is removable from housing 1. (See FIGS. 1 and 5). The frame includes a pair of longitudinally extending side members 31, 32 and a pair of end members 33, 34. Outer template 28 is appropriately secured to these members. End members 33 and 34 of frame 30 are provided with grooves 43 which are in opposed relation to form bearings for wires 44 which act as hinge elements for leaves 45. Leaves 45 are adapted to be imprinted with indicia referred to by the user in making the selections permitted by the data registering apparatus of the present invention.

Frame 30 is designed so that its side members 31 and 32 fit in corresponding recesses formed between a portion of housing 1 and side members 7 and 8b of base 2. (See FIG. 2) Preferably, frame 30 is locked into housing 1 to prevent shifting and unauthorized removal of the frame. To this purpose, base 2 is provided with a transversely extending flange 48 (See FIG. 3) overhanging die strips 13a and 13b and the inner templates. From FIG. 3, it is apparent that frame 30 with the outer template 28 thereon and carrying leaves 45 may be slid onto base 2 with end member 33 sliding under overhanging flange 48. End member 34 of frame 30 includes a downwardly depending flange 34a which is adapted to be positioned in a recess formed between inner end 9 of base 2 and a portion of housing 1. As is known in the art, a locking unit (not shown) is provided to fixedly secure end member 34 to housing 1. The locking unit provides an effective means for preventing unauthorized disassembly of the data registering apparatus.

Referring to FIGS. 3 and 4, it can be seen that base 2 is formed under overhanging flange 48 to provide a shoulder 58 against which end member 33 of frame 30 is abutted. When end member 33 is in this position and when downwardly depending flange 34a is properly positioned in the recess formed between inner end 9 of the base and a portion of housing 1, the frame 30 is exactly positioned relative to base 2 so that the position of template 28 is accurately predetermined relative to record card 5, when the card is in either its first or second operative position.

Since record card 5 and template 28 must register accurately when the card is either in its first or second operative position, base 2 includes at its upper end first and second pairs of positioning pins 89 and 90. The positioning pins are adapted to engage (See FIGS. 6a and 6b) positioning holes 92 formed in the upper portion of record card 5 when the card is in its proper position relative to the data registering apparatus.

Template 28 is provided with a plurality of apertures 61a which are adapted to register with chips 62a formed on the front face of card 5 when the card is inserted in its first operative position. Template 28 also includes an additional plurality of apertures 61b adapted to register with chips 62b formed on the back face of card 5 when the card is in its second operative position. In other words, chips 62a could be punched out of card 5 by a stylus 25 passed through holes 61a in template 28 when the record card is properly positioned in slot 4a, its first operative position. Likewise, chips 62b could be punched out of card 5 by passing the stylus through other apertures 61b in template 28 when the record card is properly positioned in slot 4b, its second operative position. To insure that the punching operation is not performed until the record card is in either its first or second operative position, inner templates 18a and 18b are mounted so that their respective apertures 63a and 63b are offset from apertures 61a and 61b and from chips 62a and 62b, respectively, when the inner templates are in their normal inoperative positions. Thus, referring to FIG. 3, respective leaf springs urge templates 18a and 18b into the normal position in which apertures 63a and 63b of the inner templates are offset from apertures 61a and 61b, respectively, of outer template 28.

Apertures 63a in template 18a are brought into registration with apertures 61a of template 28 when card 5 is in its first operative position wherein the card is inserted in slot 4a and positioned between templates 28 and 18a (See FIG. 4). When card 5 is in its first operative position, the card moves template 18a against the urgency of spring 25a so that apertures 63a are in alignment with corresponding apertures 61a in template 28 and with chips or index point areas 62a formed on the front face 5a of card 5. In the first operative position, positioning holes 92 formed in card 5 are engaged by positioning pins 89.

In the second operative position, record card 5 is inserted in slot 4b and positioned between templates 18b and 28. In this position, card 5 moves template 18b against the urgency of that template's leaf spring, causing apertures 63b in template 18b to be aligned with corresponding apertures 61b in template 28 and with the index point areas 62b formed on back face 5b of card 5. In the second operative position, positioning pins 90 engage positioning holes 92 of card 5.

In operation, record card 5 is inserted into the data registering apparatus of the present invention in either the first or second operative position. In the first operative position, card 5 is inserted in slot 4a and front face 5a of card 5 is facing away from base 2 and positioning holes 92 are engaged by positioning pins 89. Stylus 25 is applied to outer template 28 with an end of the stylus passing through a selected aperture 61a of outer template 28 and into a corresponding aperture 63a in inner template 18a. Pressure applied to the stylus pushes against corresponding chip 62a formed in the front face of the card, disengaging the chip and forcing it through slits 14 between die strips 13a. This process is repeated for all of the selections corresponding to the related indicia on the first leaf 45 and then the first leaf is turned to expose the next leaf 45 and appropriate selections are again made, as is wellknown in the art.

After all of the selections have been made by punching appropriate chips 62a formed on the front face of card 5, the card is removed from the apparatus and is then ready to be inserted in its second operative position. In the second operative position, card 5 is inserted into slot 4b between templates 28 and 18b, and back face 5b of card 5 is facing away from base 2. The positioning holes of card 5 are engaged by positioning pins 90 so that card 5 is properly positioned in its second operative position. The stylus is applied to outer template 28 with an end thereof passing through a selected aperture 61b of template 28 into a corresponding aperture 63b in inner template 18b. The stylus is depressed to apply pressure to the corresponding chip 62b on the back face of card 5 for disengaging the chip and forcing it through slits 14 between die strips 13b. The process is repeated for all of the selections corresponding to the related indicia on leafs 45 which correspond to the second operative position. After all selections have been made or votes cast, card 5 is removed from the apparatus, which is then ready to process the next card. The card with selected chips removed is then ready for processing.

As can be seen in FIGS. 6A and 6B, data record card 5 of the present invention includes a pair of positioning holes 92 asymmetrically arranged about the card's longitudinal central axis 102. When the card has its front face 5a up (FIG. 6A), positioning holes 92 are closer to left hand side 5c of card 5 than when the backface 5b of card 5 is up. (FIG. 6B). Positioning pins 89 and 90 are asymmetrically arranged about the longitudinal central axis 105 of base 2. That is, the positioning pins of positioning pin pair 90 are shifted to the right and away from the longitudinal central axis of the base relative to positioning pin pair 89. Thus, when the card is in its first operative position with front face 5a facing away from the base, positioning pins 89 engage positioning holes 92, and when the card is in its second operative position with back face 5b facing away from base 2, positioning pins 90 engage positioning holes 92.

The chip or index point areas on record card 5 are arranged to form a plurality of rows and columns as shown in FIGS. 6A and 6B. The particular card illustrated is designed to have 624 index point areas allowing for significant information to be recorded on a single card. There are 312 index point areas on the front face of the card and a like number on the back face of the card. In a first operative position, the index point areas 62a in the front face of the card can be removed to record data thereon. In the second operative position, the index point areas 62b on the back face of the card may be removed to record additional data on the card. Positioning pin pairs 89 and 90 and the positioning holes formed in the card 5 make it impossible to improperly insert the card into the data registering apparatus. That is, the card cannot be inserted in its first operative position unless the front face thereof is facing away from base 2. Similarly, the card cannot be inserted in its second operative position unless the back face thereof is facing away from base 2. Thus, erroneous results are completely obviated because the punching element cannot reach the card until the card is in one of its two proper positions.

The record card further includes along its central longitudinal axis a column of circular openings 108. These openings are designed to assist movement of the card through the data processing apparatus which reads the card.

Another embodiment of the data registering apparatus of the present invention is shown in FIGS. 7 and 8. This embodiment is similar to the embodiment of FIGS. 1-5. The embodiment of FIGS. 7-8, however, includes two separate frame assemblies 300 and 301 mounted within housing 1, and separate base assemblies 2a and 2b. Each base includes a throat portion 3 having appropriate slots formed therein for insertion of the data record card. Base 2a includes positioning pins 89, and base 2b includes positioning pins 90. As heretofore described, the respective pairs of positioning pins are asymmetrically arranged so that they are adapted to engage the positioning holes formed in the uppr portion of the record card when the card is in its proper position relative to the data registering apparatus. In this embodiment, positioning pin pairs 89 and 90 are asymmetrically arranged about the longitudinal central axis 105a of housing 1, which corresponds to axis 105 of the embodiment of FIGS. 1-5.

Each base includes a template pair. Base 2a includes a template 228 positioned above a template 180a, and base 2b includes a template 229 positioned above a template 180b. Templates 228 and 229 carry respective leafs 450 and 451 on which is imprinted the indicia referred to by the user in making his selections. The template pairs of the respective bases are configured to operate in a manner like that of the template arrangement of the embodiment of FIGS. 1-5. Thus, when the data record card is in its first operative position, that is the card is properly positioned in slot 4a, corresponding apertures in templates 180a and 228 are in alignment. Similarly, when the record card is in its second operative position, that is it is properly positioned in slot 4b, corresponding apertures in templates 180b and 229 are in alignment.

It is expected that the embodiment of FIGS. 7-8 may comprise two data registering devices of the type shown in U.S. Pat. No. 3,240,409, referred to above, modified in accordance with the teachings of the present invention and mounted in a single housing.

Although certain specific embodiments of the invention have been described herein in detail, the invention is not to be limited to only such embodiments, but rather only by the appended claims.

What is claimed is:

1. A data registering apparatus for registering data on a data processable record card, comprising:
   a base;
   first and second templates positionable adjacent to one another;
   a third template positionable above said first and second templates;
   said third template provided with apertures adapted to register with corresponding apertures in said first template and with a first set of index point areas of said record card when said card is positioned in a first superposed operative position relative to said first and third templates;
   said third template provided with additional apertures adapted to register with corresponding apertures in said second template and with a second set of index point areas of said record card when said card is positioned in a second superposed operative position relative to said second and third templates;
   means for mounting said templates together in a normal position with the apertures of said third template offset from the corresponding apertures of said first and second templates;

means for shifting said third template relative to said first and second templates to bring said templates and said record card into said first or second operative position; and positioning means for locating said record card in said first operative position or said second operative position.

2. The data registering apparatus of claim 1 wherein said record card includes a pair of positioning holes located at the upper end thereof with said positioning holes asymmetrically arranged about the longitudinal central axis of said card.

3. The data registering apparatus of claim 2 wherein said first and second sets of said index point areas are formed on the front and back faces, respectively, of said card.

4. The data registering apparatus of claim 3 wherein said positioning means includes:

a first pair of positioning pins located on said base to engage said pair of positioning holes when said card is in said first operative position; and a second pair of positioning pins located on said base to engage said pair of positioning holes when said card is in said second operative position.

5. A data registering apparatus for registering data on a data processable record card, comprising:

a base;

first and second templates positionable adjacent to one another on said base;

a third template positionable above said first and second templates;

said third template provided with apertures adapted to register with corresponding apertures in said first template and with a first set of index point areas on a front face of said record card when said card is positioned in a first superposed operative position relative to said first and third templates with said front face thereof facing away from said base;

said third template provided with additional apertures adapted to register with corresponding apertures in said second template and with a second set of index point areas on a backface of said record card when said card is positioned in a second superposed operative position relative to said second and third templates with said back face thereof facing away from said base;

means for mounting said templates together in a normal position with the apertures of said third template offset from the corresponding apertures of said first and second templates;

means for shifting said first and second templates relative to said third template to bring said templates and said record card into said first or second operative position; and positioning means for locating said record card in said first or second operative position.

6. The data registering apparatus of claim 5 wherein said record card includes a pair of positioning holes located at the upper end thereof with said positioning holes asymmetrically arranged about the longitudinal central axis of said card.

7. The data registering apparatus of claim 6 wherein said first and second sets of index point areas are arranged in columns and rows on said card and wherein the number of said index point areas of said first set is equal to that of said second set.

8. The data registering apparatus of claim 6 wherein said positioning means includes:

a first pair of positioning pins located on a throat portion of said base to engage said pair of positioning holes so that said first set of index point areas registers with said apertures in said first and third templates when said card is in said first operative position; and a second pair of positioning pins located on the throat portion of said base to engage said pair of positioning holes so that said second set of index point areas registers with said apertures in said second and third templates when said card is in said second operative position.

9. The data registering apparatus of claim 8 wherein said first and second pairs of positioning pins are asymmetrically arranged about the longitudinal central axis of said base.

10. A data registering apparatus for registering data on a data processable record card, comprising:

a base;

first and second templates positionable adjacent to one another on said base and each having a plurality of apertures;

a third template positionable above said first and second templates and provided with a plurality of apertures;

said templates being formed with the apertures of said third template adapted to register with the apertures of said first template and with index point areas formed on a first side of said card when said record card is positioned in an operative position relative to said first template, and said third template having additional apertures adapted to register with the apertures of said second template and with index point areas formed on a second side of said record card when said card is positioned in an operative position relative to said second template;

means for mounting said templates together in a normal position with the apertures of said third template offset from the corresponding apertures of said first and second templates and the index point areas of said record card;

means for shifting one of said templates to bring said third template, said record card, and said first or second template into an operative position; and means for positioning said first side of said record card in said operative position relative to said first template, and for positioning said second side of said record card in said operative position relative to said second template.

11. A data registering apparatus for registering data on a data processable record card, comprising:

a base;

a first pair of templates each provided with a plurality of apertures;

a second pair of templates positioned next to said first pair, and each of said templates of said second pair provided with a plurality of apertures;

said templates of said first pair formed with the apertures of one adapted to register with the apertures of the other and with a first plurality of index point areas formed on a first side of said record card when said templates of said first pair and said card are positioned in a first superposed operative position, and said templates of said second pair formed with the apertures of one adapted to register with the apertures of the other and with a second plurality of index point areas formed on a second side of said card when said templates of said second pair and said card are positioned in a second superposed operative position;

means for mounting said templates of said respective pairs in a normal position wherein the apertures of one template is offset from the corresponding apertures of the other template of said pair;

means for shifting one of said templates of said respective pairs to bring said templates of said respective pairs and said record card into said first or second operative position; and positioning means for locating said record card in said first operative position or said second operative position.

12. A data registering apparatus for registering data on a data processable record card, comprising:

a base;

a first pair of templates each provided with a plurality of apertures;

a second pair of templates positioned adjacent to said first pair, and each of said templates of said second pair provided with a plurality of apertures;

said templates of said first pair formed with the apertures of one adapted to register with the apertures of the other and with a first plurality of index point areas formed on a first side of said record card when said templates of said first pair and said card are positioned in a first operative position, and said templates of said second pair formed with the apertures of one adapted to register with the apertures of the other and with a second plurality of index point areas formed on a second side of said card when said templates of said second pair and said card are positioned in a second operative position;

means for mounting said templates of said respective pairs in a normal position with the apertures of one template offset from the corresponding apertures of the other template of said pair;

means for shifting one of said templates of said respective pairs to bring said templates of said respective pairs and said record card into said first or second operative position;

a first pair of positioning pins carried by said base and adapted to be received in a pair of positioning holes in said record card when said card is in said first operative position so that said apertures of said templates of said first template pair register with each other and with said first plurality of index point areas on said first side of said card; and a second pair of positioning pins carried by said base and adapted to be received in said positioning holes in said record card when said card is in said second operative position so that said apertures of said templates of said second template pair register with each other and with said second plurality of index point areas on said second side of said card.

13. The data registering apparatus of claim 12 wherein said positioning holes are located at the upper end of said record card with said positioning holes asymmetrically arranged about the longitudinal central axis of said card.

14. The data registering apparatus of claim 13 wherein said first and second plurality of index point areas are located on a front face and a back face, respectively, of said record card.

15. The data registering apparatus of claim 14 wherein said first and second plurality of index point areas are arranged in columns and rows on said record card.

16. The data registering apparatus of claim 12 wherein said second pair of positioning pins is offset from said longitudinal central axis of said base relative to said first pair of positioning pins.

* * * * *